US010664890B2

(12) United States Patent
Bianchini et al.

(10) Patent No.: US 10,664,890 B2
(45) Date of Patent: May 26, 2020

(54) METHOD AND SYSTEM FOR LOCATING A SERVICE PROVIDER

(71) Applicant: ADP, LLC, Roseland, NJ (US)

(72) Inventors: Leandro da Silva Bianchini, Porto Alegre (BR); Mauricio Filipe Rossetto Chaves, São Leopoldo (BR); Fernando Luis Muller Morassutti, Porto Alegre (BR); Diego Tremper, Porto Alegre (BR)

(73) Assignee: ADP, LLC, Roseland, NJ (US)

( * ) Notice: Subject to any disclaimer, the term of this patent is extended or adjusted under 35 U.S.C. 154(b) by 847 days.

(21) Appl. No.: 14/803,621

(22) Filed: Jul. 20, 2015

(65) Prior Publication Data

US 2017/0024794 A1    Jan. 26, 2017

(51) Int. Cl.
    *G06Q 30/00*    (2012.01)
    *G06Q 30/06*    (2012.01)

(52) U.S. Cl.
    CPC .................. *G06Q 30/0631* (2013.01)

(58) Field of Classification Search
    None
    See application file for complete search history.

(56) References Cited

U.S. PATENT DOCUMENTS

| | | | |
|---|---|---|---|
| 8,423,387 B1 | 4/2013 | Mirza | |
| 2005/0251531 A1* | 11/2005 | Jen | A63F 13/12 |
| 2006/0015369 A1* | 1/2006 | Bachus | G06Q 10/10 705/2 |
| 2006/0100904 A1* | 5/2006 | Jee | G06Q 10/06398 705/2 |
| 2007/0038594 A1* | 2/2007 | Goodwin | G06Q 10/10 |
| 2009/0030927 A1* | 1/2009 | Cases | G06Q 10/06311 |
| 2010/0057485 A1* | 3/2010 | Luft | H04W 4/70 455/411 |
| 2010/0235295 A1 | 9/2010 | Zides et al. | |
| 2011/0125527 A1 | 5/2011 | Nair | |

(Continued)

OTHER PUBLICATIONS

M. Tim Jones, "Recommender systems, Part 2: Introducing open source engines. Explore software for building a recommendation capability", Dec. 12, 2013, www.ibm.com (https://www.ibm.com/developerworks/library/os-recommender2/index.html) (Year: 2013).*
Zheng Qin, "Introduction to E-commerce", 2009, Springer, springer.com (Year: 2009).*
firsthealth.org website, Mar. 26, 2015 (https://web.archive.org/web/20150326193852/https://www.firsthealth.org/directory) (Year: 2015).*

(Continued)

*Primary Examiner* — Naeem U Haq
*Assistant Examiner* — Norman Donald Sutch, Jr.
(74) *Attorney, Agent, or Firm* — Alissa Pohlman; Andrew M. Calderon; Roberts Calderon Safran & Cole, P.C.

(57) ABSTRACT

Systems and methods for providing recommendations of healthcare service providers are provided. A method includes receiving search criteria from a computing device of a search user. The method also includes determining at least one group of users associated with the search user. The method additionally includes determining recommendations that satisfy the search criteria and that are associated with at least one user in the at least one group of users. The method further includes transmitting the determined recommendations to the computing device of the search user. The determining the at least one group of users and the determining the recommendations are performed by a recommendation tool running on a computing device.

20 Claims, 10 Drawing Sheets

(56) References Cited

U.S. PATENT DOCUMENTS

| | | | |
|---|---|---|---|
| 2012/0130973 A1* | 5/2012 | Tamm | G06F 17/30545 707/706 |
| 2012/0239417 A1 | 9/2012 | Pourfallah et al. | |
| 2013/0173798 A1* | 7/2013 | Micucci | H04L 67/1044 709/225 |
| 2013/0254215 A1* | 9/2013 | Davar | G06F 17/30861 707/748 |
| 2014/0058753 A1 | 2/2014 | Wild | |
| 2014/0180715 A1 | 6/2014 | Phillips et al. | |
| 2014/0365331 A1* | 12/2014 | Hafeez | G06Q 30/0631 705/26.7 |
| 2015/0006261 A1* | 1/2015 | Gutman | G06Q 10/06393 705/7.39 |
| 2015/0088693 A1* | 3/2015 | Moore | G06Q 30/0627 705/26.61 |
| 2016/0378852 A1* | 12/2016 | Goldberg | G06F 16/3329 707/722 |
| 2018/0018429 A1* | 1/2018 | Rice | G06F 19/322 |

OTHER PUBLICATIONS https://www.johnsons.net; "Portfolio"; Apr. 3, 2012; (https://www.johnsons.net/html2/portfolio.php) (Year: 2012).*

CogniMed LLC; "CogniMed announces DocSite universal physician Web page service"; Mar. 27, 1997; Business Wire (Year: 1997).*

Unknown.,"Mayo Clinic", Mayo Foundation for Medical Education and Research. 1998-2014, 2 pages.

Swan,"Emerging Patient-Driven Health Care Models: An Examination of Health Social Networks, Consumer Personalized Medicine and Quantified Self-Tracking", 2009, 34pp.

"ZocDoc".,https://en.wikipedia.org/wiki/ZocDoc, Apr. 21 2015, 2 pages.

"Heathgrades".,http://en.wikipedia.org/wiki/Healthgrades, Feb. 25, 2015 3 pages.

"Vitals(Website)".,http://en.wikipedia.org/wiki/Vitals_%28website%29., May 14, 2015,3 pp.

* cited by examiner

METHOD AND SYSTEM FOR LOCATING A SERVICE PROVIDER

TECHNICAL FIELD

The invention relates to locating a service provider and, more particularly, to a method and system for sharing healthcare provider recommendations among associated users.

BACKGROUND

Websites that enable users to provide reviews of service providers are common. Such reviews, however, are not very useful for a number of reasons. One such reason is that a reader of online reviews knows nothing about the author of a particular review and, thus, has no level of trust regarding the particular review. For example, because authors of online reviews are anonymous, there is no way for a reader to tell whether a positive review is written by a friend or employee of a service provider or if a negative review is written by a competitor of the service provider.

Another problem with online reviews is rooted in social influence bias. For example, a well intentioned author of a review may be influenced by other people's reviews (positive or negative), and this influence may cause the author to alter their original review in a more positive or more negative manner.

Advertising represents another issue with online review websites. For example, some online review websites permit service providers to pay to have their advertisements placed in response to user searches, thus allowing service providers to buy their way to the top of a search result. A user looking for reviews of service providers has no way of knowing that the online review website functions in this manner.

SUMMARY OF INVENTION

In accordance with a first aspect of the invention, there is a method providing recommendations for service providers. The method includes receiving search criteria from a computing device of a search user. The method also includes determining at least one group of users associated with the search user. The method additionally includes determining recommendations that satisfy the search criteria and that are associated with at least one user in the at least one group of users. The method further includes transmitting the determined recommendations to the computing device of the search user. The determining the at least one group of users and the determining the recommendations are performed by a recommendation tool running on a computing device.

In accordance with another aspect of the invention, there is a computer system for providing recommendations of healthcare service providers. The system includes a hardware memory device that stores program instructions of a recommendation tool. The system also includes a hardware processor that executes the program instructions and causes the computer system to: receive recommendations of healthcare service providers from at least one recommending user contained in a plurality of users; store the recommendations in a recommendations database; receive search criteria from a search user; determine a group of users associated with the search user, wherein the group of users is a subset of the plurality of users; determine matching recommendations from the recommendations stored in the recommendations database, wherein each of the matching recommendations satisfies the search criteria and is associated with one of the users in the group of users; and transmit the matching recommendations to the search user.

In accordance with another aspect of the invention, there is a computer program product for providing recommendations of healthcare service providers. The computer program product includes computer readable program instructions stored on computer readable storage medium. The computer readable program instructions are executable on a computing device to cause the computing device to: receive recommendations of healthcare service providers from at least one recommending user contained in a plurality of users; store the recommendations in a recommendations database; receive search criteria from a search user; determine a first group of users associated with the search user and a second group of users associated with the search user, wherein the first group is a first subset of the plurality of users, and the second group is a second subset of the plurality of users; determine a first matching recommendation from the recommendations stored in the recommendations database, wherein the first matching recommendation satisfies the search criteria and is associated with a first user in the first group of users; determine a second matching recommendation from the recommendations stored in the recommendations database, wherein the second matching recommendation satisfies the search criteria and is associated with a second user in the second group of users; transmit the first matching recommendation and an identity of the first user to the search user; and transmit the second matching recommendation and an identity of the second user to the search user.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION OF ASPECTS OF THE INVENTION

Figure 1:
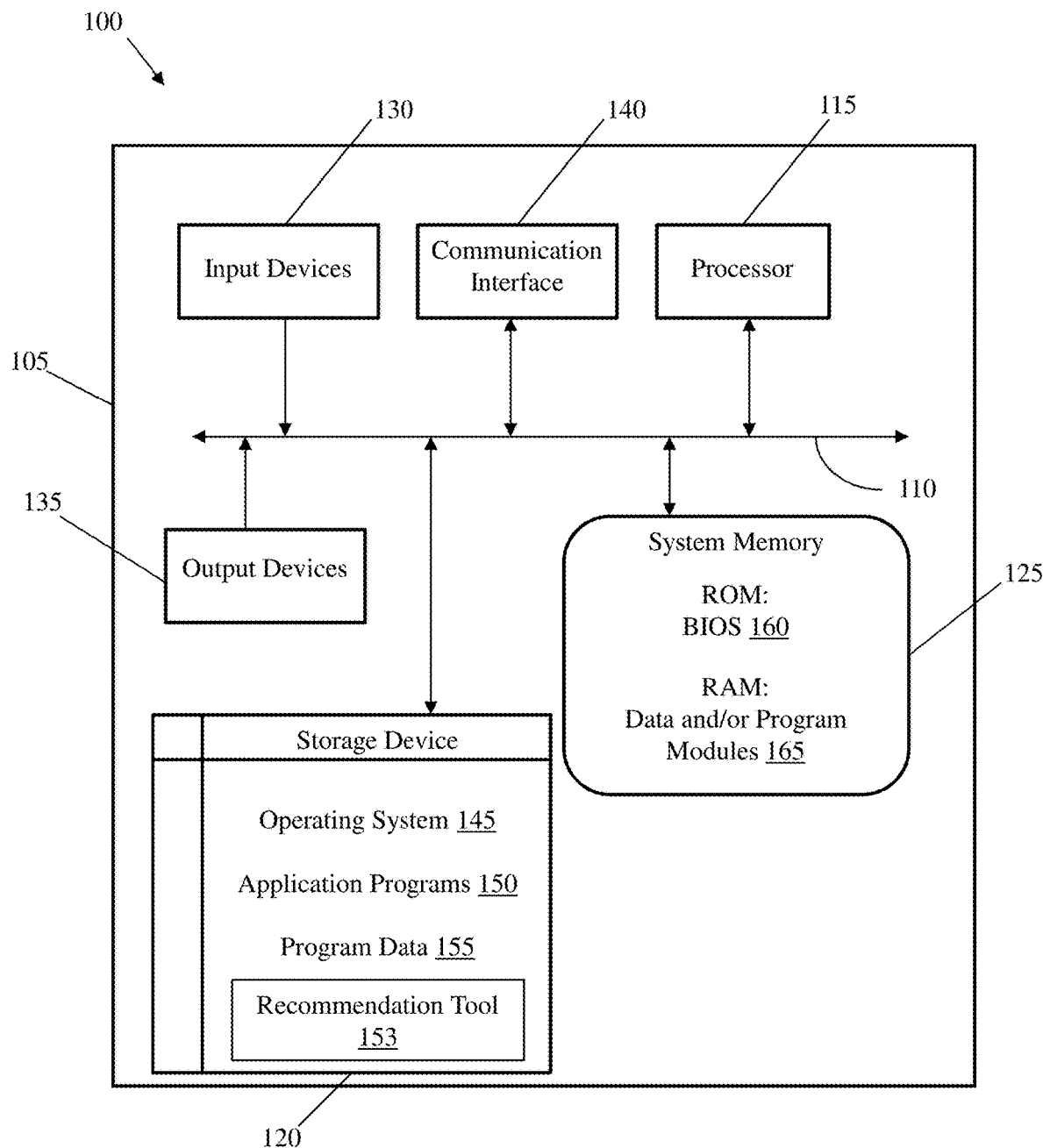
FIG. 1 is an illustrative architecture of a computing system implemented as embodiments of the present invention.

The invention relates to locating a service provider and, more particularly, to a method and system for sharing healthcare provider recommendations among associated users. Aspects of the invention are directed to assisting people in obtaining recommendations for service providers (such as healthcare providers), instead of searching for online reviews of service providers. Aspects described herein include: receiving recommendations about service providers from plural users; associating each recommendation with a respective one of the users; storing the recommendations; receiving a search for a service provider from a search user; determining one or more groups of the users associated with the search user; determining recommendations associated with users in the one or more groups; and presenting the determined recommendations to the search user. In embodiments, the determining the one or more groups of the users associated with the search user is performed using at least one of: human resources data stored in a human resources database; benefits data stored in a benefits database; and payroll data stored in a payroll database. Aspects of the invention also include permitting the search user to send a request for recommendations to users within the one or more groups. In this manner, implementations of the invention provide a method and system for sharing healthcare provider recommendations among associated users.

Online reviews of service providers are problematic and provide little useful information to a reader of such reviews. For example, an online review of a healthcare provider (e.g., doctor) is essentially the opinion of one anonymous person about the healthcare provider. The online review does not consider any aspect of the reader of the review. Opposite to that, a recommendation is given from one person to another person considering the needs or situation of the receiving person. A person typically wants to find the right healthcare provider for them, considering their location, medical plan, medical profile, etc. A recommendation presupposes some level of trust and previous knowledge between the parties, while a review does not. Implementations of the invention leverage an information marketplace to provide a mechanism for obtaining recommendations from associated users. Being part of the marketplace fortifies security aspects of the recommendations mechanism since a user seeking recommendations is assured that there are not any users employing anonymous or fake profiles to disparage or promote a particular healthcare provider. In this manner, anonymity is removed and protection is provided to both the user seeking recommendations and the healthcare providers.

The technical solutions provided herein involve gathering data from plural disparate data sources and consolidating the data in a single, dynamic interface. The technical solutions provided herein also include automatically determining a group of users associated with a search user based on employment data, automatically determining recommendations for healthcare providers that were made by recommending users contained in the group of users, and automatically providing these recommendations and identities of the recommending users to the search user. In this manner, implementations of the invention solve a problem by providing a search user with recommendations for healthcare providers, wherein the recommendations have a level of trust because they are from recommending users that are associated with the search user (as opposed to being anonymous online reviews).

FIG. 1 is an illustrative architecture of a computing system 100 implemented as embodiments of the present invention. The computing system 100 is only one example of a suitable computing system and is not intended to suggest any limitation as to the scope of use or functionality of the invention. Also, computing system 100 should not be interpreted as having any dependency or requirement relating to any one or combination of components illustrated in computing system 100.

As shown in FIG. 1, computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present invention, which may be operatively implemented by the computer readable program instructions. In embodiments, processor 115 may receive input signals from one or more input devices 130 and/or drive output signals through one or more output devices 135. The input devices 130 may be, for example, a keyboard or touch sensitive user interface (UI) as further described below. The output devices 135 can be, for example, any display device, printer, etc., as further described below.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present invention In embodiments, storage device 120 may store operating system 145, application programs 150, and program data 155 in accordance with aspects of the present invention.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

In embodiments, the application programs 150 comprises a recommendation tool 153 that includes special-purpose program code that is specifically configured to perform one or more of the functions described herein, such as: receiving recommendations about service providers from plural users; associating each recommendation with a respective one of the users; storing the recommendations; receiving a search for a service provider from a search user; determining one or more groups of the users associated with the search user; determining recommendations associated with users in the one or more groups; and presenting the determined recommendations to the search user. For example, program code of the recommendation tool 153 may be loaded as one or more program modules 165 and executed by the processor 115 to cause the computing device 105 to perform one or more of the functions described herein.

The one or more input devices 130 may include one or more mechanisms that permit an operator to input information to computing device 105, such as, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof. The one or more output devices 135 may include one or more mechanisms that output information to an operator, such as, but not limited to, audio speakers, headphones, audio line-outs, visual displays, antennas, infrared ports, tactile feedback, printers, or combinations thereof.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to generate and present a user interface including a compliance indicator and related functionality as described herein. In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In some embodiments, an operator may interact with computing device 105 via the one or more input devices 130 and/or the one or more output devices 135 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present invention. Thus, the steps, methods and/or functionality disclosed herein can be implemented in any combination of hardware circuitry and software.

Figure 2:
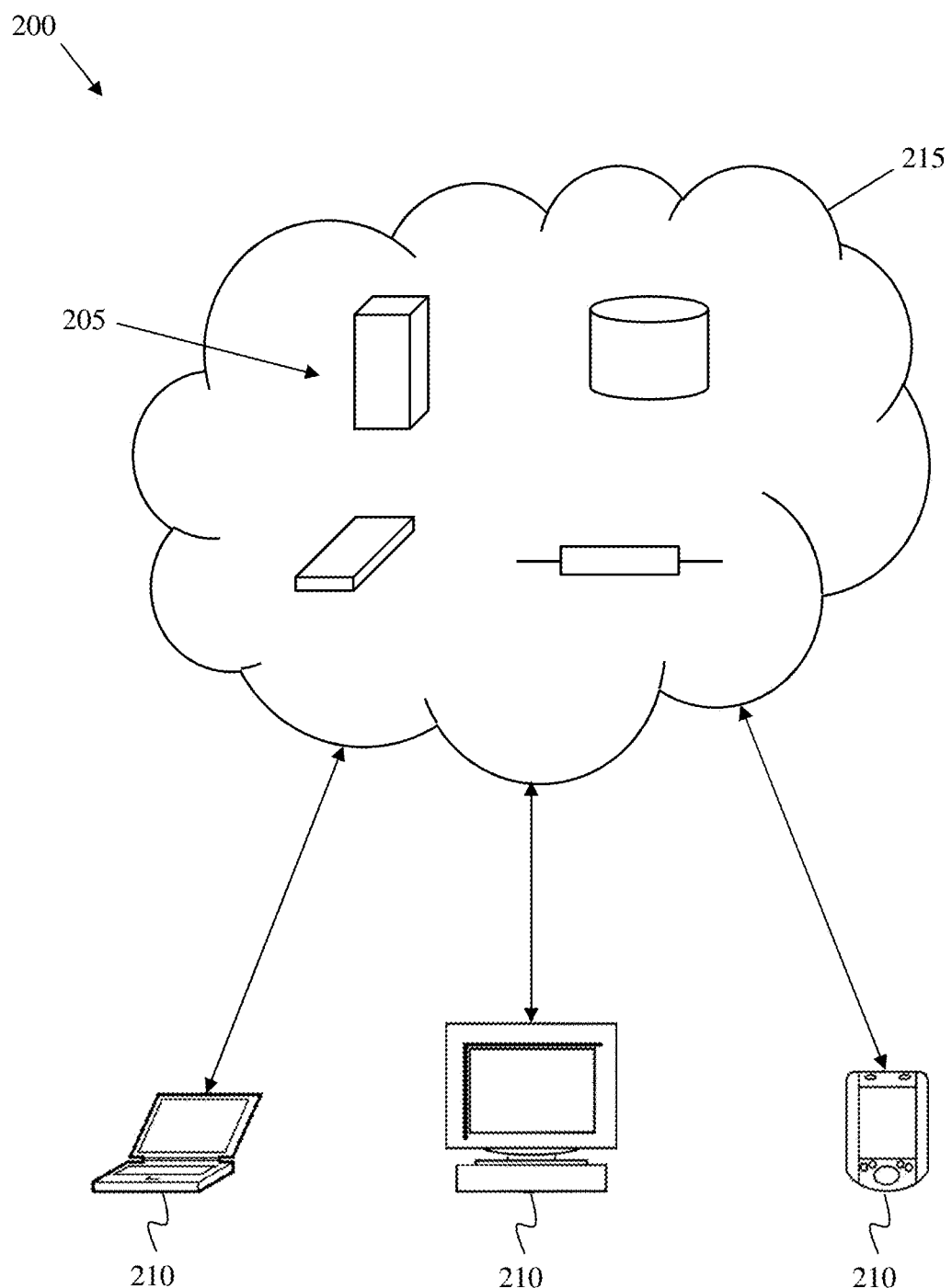
FIG. 2 shows an exemplary cloud computing environment in accordance with aspects of the invention.

FIG. 2 shows an exemplary cloud computing environment 200. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may includes one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

One or more cloud resources 205 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources 205 may be conceptually structured in functional abstraction layers including a hardware and software layer, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
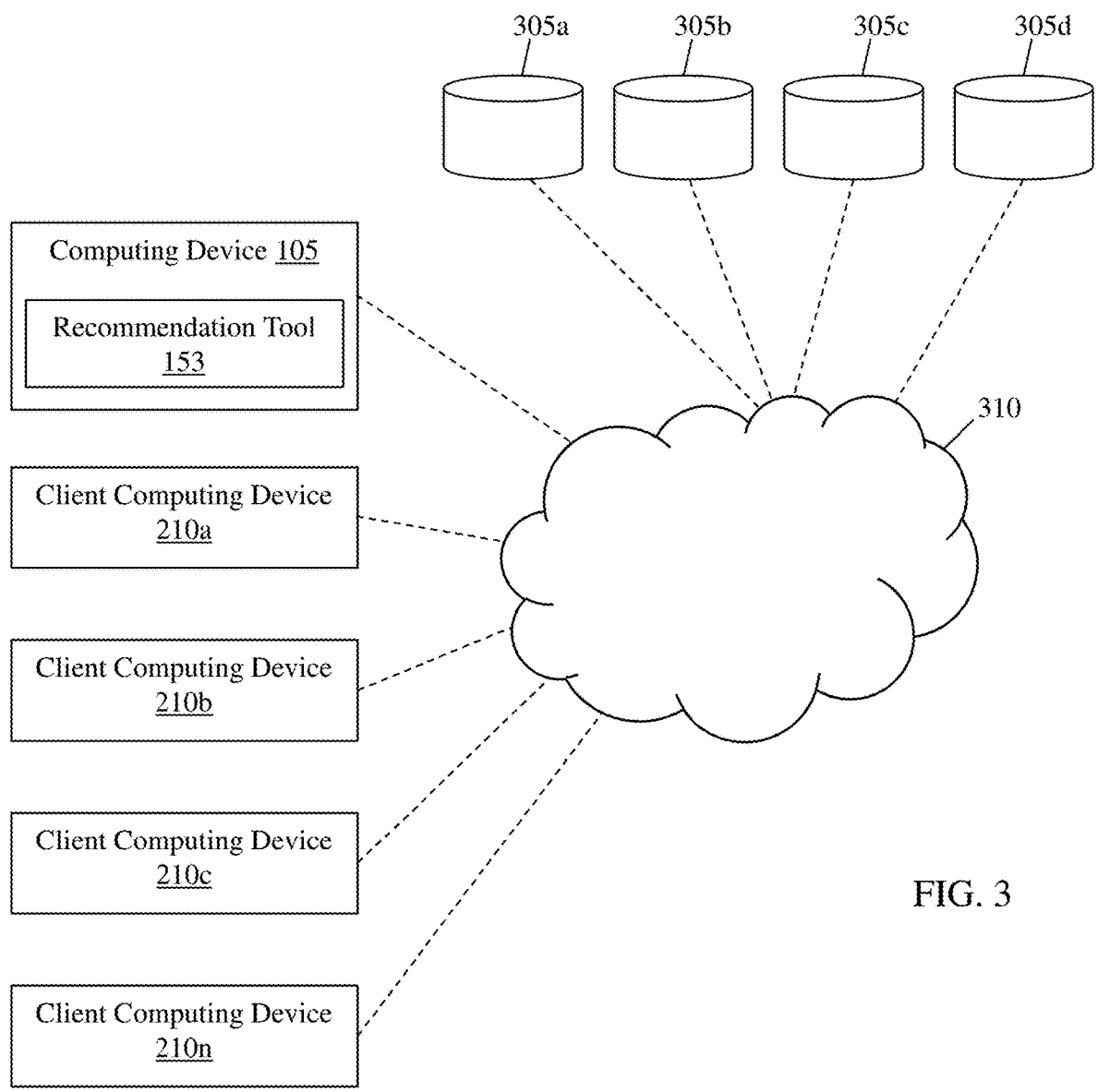
FIG. 3 shows a block diagram in accordance with aspects of the invention.

FIG. 3 shows a block diagram of a networked computing environment in accordance with aspects of the invention. In embodiments, a computing device 105 running the recommendation tool 153 communicates with a plurality of databases 305a, 305b, 305c via a network 310. The network 310 may be any suitable communications network or combination of networks, including but not limited to a local area network (LAN), a general wide area network (WAN), and/or a public network (e.g., the Internet). In cloud implementations, the network 310 may constitute the network 215 described with respect to FIG. 2.

In embodiments, the databases comprise a human resources (HR) database 305a, a benefits database 305b, and a payroll database 305c that are normally separate and not maintained as a single data source. In fact, these different databases 305a, 305b, 305c include disparate information and disparate fields such that information in each of these databases would not be combinable due to technological issues, such as integration issues known to those of skill in the art. The HR database 305a may include information for each employee such as: employee name, employee work address, employee home address, employer (company) name, and employer (company) organization chart. The benefits database 305b may include information for each employee such as: plan identifier (e.g., plan name) and plan type (e.g., HMO, PPO, etc.) of medical insurance associated with each employee. The payroll database 305c may include information for each employee such as: annual income of the employee, and hourly pay rate of the employee.

As these databases 305a, 305b, 305c include such different information, prior to implementations of the systems and processes of the invention, there was no need for any single entity to combine or integrate such information together as there was no identifiable reason to even consider using such information together—and to the extent that there may have been such a purpose, such information was not capable of being combined in any logical or meaningful manner. One or more of the databases 305a-c may be maintained by the employer or by a service provider that provides services (e.g., payroll services) to the employer. In embodiments, the data contained in the databases 305a-c may be searched based on a query by the recommendation tool 153, and data that satisfies the query may be transmitted to the recommendation tool 153 via the network 310. In a preferred embodiment, the databases 305a-c comprise a marketplace of data this is accessible by specific API's. For example, the recommendation tool 153 may use an HR API that is specific to the HR database 305a to request and obtain information from the HR database 305a. Similarly, the recommendation tool 153 may use a benefits API that is specific to the benefits database 305b to request and obtain information from the benefits database 305b. Similarly, the recommendation tool 153 may use a payroll API that is specific to the payroll database 305c to request and obtain information from the payroll database 305c. The recommendation tool 153 may use the data received from one or more of the databases 305a-c in performing one or more functions described herein.

In embodiments, the computing device 105 may be maintained by a third party service provider which would then have access to plural databases of plural different employers. For example, databases 305a-c may include HR data, benefits data, and payroll data of more than one employer. In this way, the computing device 105 associated with the third party service provider can access these types of databases for providing services (e.g., payroll, benefits management, etc.) to plural different employers.

In an exemplary embodiment, the computing device 105 and/or the recommendation tool 153 is a cloud resource 205 that is accessed by a plurality of client computing devices 210a-n, e.g., as described with respect to FIG. 2. For example, each client computing device 210a-n may run a client application that is executed by and/or under the control of the user. The client application may interface with the computing device 105 via the network, and the computing device 105 may perform the functions described herein and transmit data to the client computing devices 210a-n for displaying data on the client computing devices 210a-n via the client application.

Still referring to FIG. 3, in accordance with aspects of the invention, the computing device 105 running the recommendation tool 153 communicates with a recommendation database 305d via the network 310. In embodiments, the recommendation database 305d stores data associated with recommendations made by users about healthcare service providers, e.g., doctors. As described herein, the users are employees for which data is stored in one or more of the databases 305a-c. In this manner, the databases 305a-c defines a population of users, and the recommendation database 305d stores recommendations that are provided by any number users contained in the population of users. In an illustrative operation, any number of the users may utilize client computing devices 210a-n to input data that defines recommendations about respective healthcare service providers. The computing device 105 running the recommendation tool 153 receives the data from the client computing devices 210a-n and causes the data to be stored in the recommendation database 305d. Each recommendation may be associated with a particular one of the users. For example, a user-identification (user-ID) that is defined in one or more of the databases 305a-c may be stored with a recommendation in the recommendation database 305d. Subsequently, when a user of one of the client computing devices performs a query for a healthcare service provider, the recommendation tool 153 uses the data stored in the recommendation database 305d to generate a result for the query.

In embodiments, the recommendation database 305d is separate and distinct from the databases 305a-c. For example, in an exemplary implementation, the recommendation tool 153 can only read data from the databases 305a-c, but can read and write data to and from the recommendation database 305d. This is because, in some implementations, the data stored in databases 305a-c is collected and maintained by a different entity than the data stored in the recommendation database 305d, such that the recommendation tool 153 is not authorized to alter the data in the databases 305a-c.

FIGS. 4-9 show an exemplary user interface (UI) 400 that is generated by the computing device 105 running the recommendation tool 153 in accordance with aspects of the invention. The UI 400 may be displayed on a computing device such as one of client computing devices 210a-n. In a preferred embodiment, the client computing devices are mobile computing devices, such as smartphones, tablet computers, etc., that have wireless communication capability, and the UI 400 is displayed on the client computing device based on data provided from the computing device 105. For example, the UI 400 may be displayed on the client computing device as part of a software application that is running on the client computing device, and the appearance of the UI 400 may change based on data received from the computing device 105.

Figure 4:
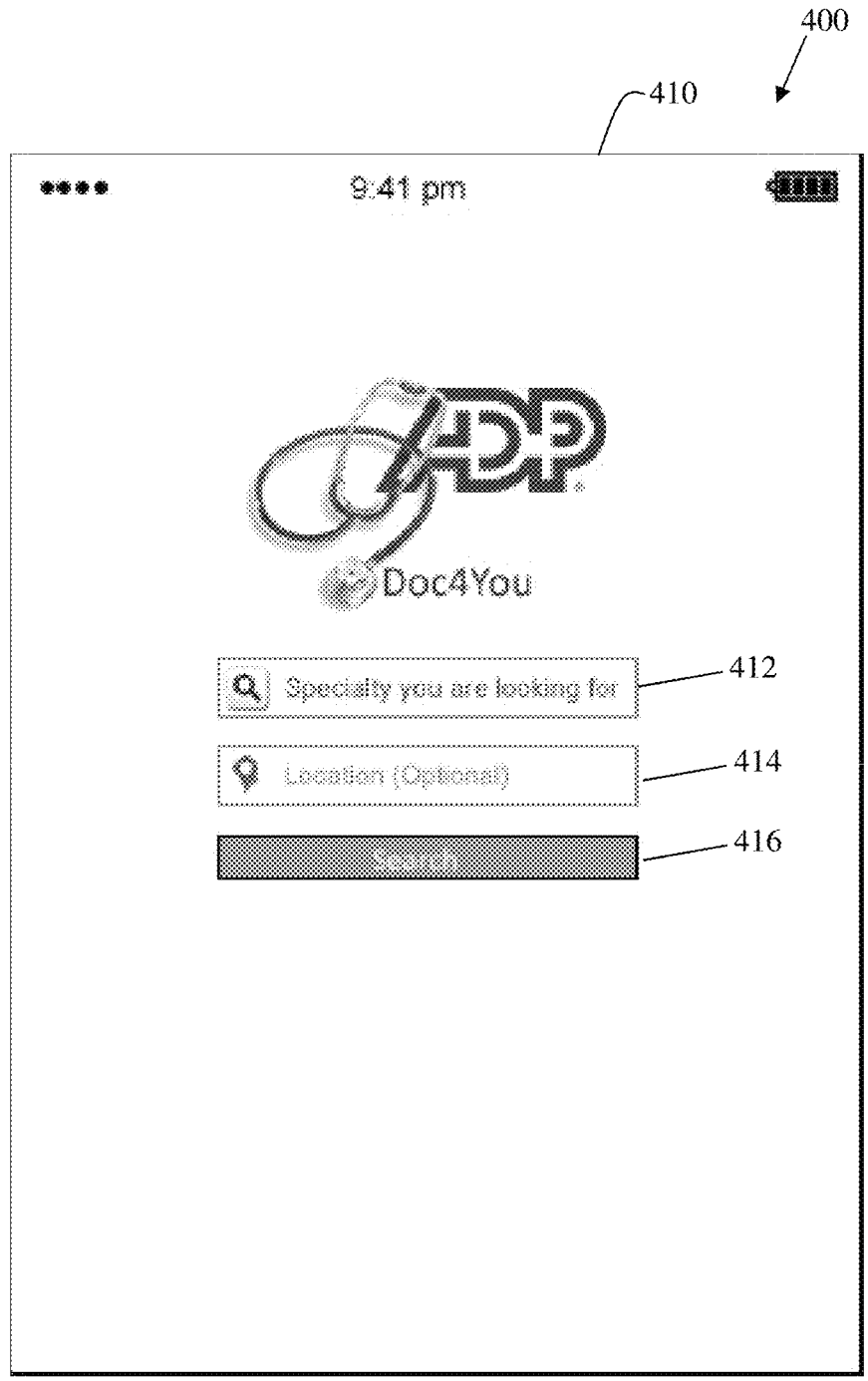
FIGS. 4-9 show exemplary user interfaces that illustrate functionality in accordance with aspects of the invention.

FIG. 4 shows a first screen 410 of the UI 400 in accordance with aspects of the invention. The first screen 410 is a search screen that is displayed when a search user opens/runs the application on their mobile device (e.g., one of client computing devices 210a-n). In embodiments, the first screen 410 includes a specialty field 412 and a location field 414. The specialty field 412 is an input field by which the search user inputs a specialty of a healthcare provider for which they want to search. Examples of specialty include pediatrician, cardiologist, optometrist, etc., although any number and type of predefined specialties may be used in aspects described herein. In an embodiment, the search user enters data in the specialty field 412 by typing (e.g., using a keyboard function of their computing device), and the application suggests one of a plurality of predefined specialties as the search user types letters in the specialty field 412. In another embodiment, the specialty field 412 may include a drop down menu that the search user can select one of a plurality of predefined specialties by using a finger tap or other input.

Still referring to FIG. 4, the first screen 410 also includes a location field 414 by which the search user may input a location to search for a healthcare provider. The search user may use a keyboard or other input of their computing device to enter a location such as a street address or zip code, although other types of location information may be used in aspects described herein. The system is configured to use a default location in the event the search user does not enter a location in the location field 414. The default location can be any desired location, such as the search user home address, work address, or current location determined by GPS of the client computing device. In this manner, the location may be input by the search user or may be automatically determined without input from the search user.

With continued reference to FIG. 4, the first screen 410 also includes a selectable object 416 by which the search user may submit their search query for a healthcare provider. The selectable object 416 may be a button, for example, that the search user selects (e.g., finger taps) after entering a specialty in the specialty field 412 and optionally entering a location in the location field 414.

After selecting the selectable object 416, the search user client computing device (e.g., 210a) communicates search data to the computing device 105. The search data includes the selected specialty (from specialty field 412) and location (from location field 414 or default location). The search data also includes identifier information of the search user, such as a user name or employee number. The search data is communicated from the search user client computing device (e.g., 210a) to the computing device 105 via the network 310.

Upon receiving the search data, the recommendation tool 153 determines one or more groups of users associated with the search user that submitted the search query. According to aspects of the invention, the recommendation tool 153 determines the one or more groups of users based on data from one or more of the databases 305a-c. The data used to determine the one or more groups may include for each user: employer (company) name, employer (company) organization chart, work address, home address, and medical plan. Implementations are not limited to this data, and any suitable data may be used in determining the one or more groups of users associated with the search user.

In an embodiment, the one or more groups of users associated with the search user include a first group, a second group, and a third group. The first group includes a first subset of the population of users defined in the databases 305a-c, and in this example includes users defined in one or more of the databases 305a-c as being on a same work team as the search user. The second group includes a second subset of the population of users defined in the databases 305a-c, and in this example includes users defined in one or more of the databases 305a-c as having a same employer as the search user. The third group includes a third subset of the population of users defined in the databases 305a-c, and in this example includes all other users defined in one or more of the databases 305a-c that are not contained in the first group or the second group. In embodiments, the recommendation tool 153 accesses the HR database 305a to determine the employer name for the search user. For example, using the identifier information of the search user as part of a search query, the recommendation tool 153 may utilize an API that is specific to the HR database 305a to obtain the name of the search user's employer. In a similar manner, the recommendation tool 153 may access the HR database 305a to obtain an organization chart for the search user's employer. In a similar manner, the recommendation tool 153 may access the HR database 305a to determine all users that are on a same work team as the search user, and define this set of users as being in the first group. In a similar manner, the recommendation tool 153 may access the HR database 305a to determine all users that have the same employer as the search user, and define this set of users as being in the second group. In a similar manner, the recommendation tool 153 may access the HR database 305a to determine all users that have a different employer than the search user, and define this set of users as being in the third group.

Implementations of the invention are not limited to the first group, second group, and third group described herein. Instead, any number of groups may be used. Moreover, the one or more groups may be determined in any suitable manner using information from at least one of the databases 305a-c. For example, the one or more groups may be determined based on at least one of: users having a work address within a certain distance of the search user work address; users having a home address within a certain distance of the search user home address; users having a same healthcare plan as the search user; users having a similar income as the search user (e.g., an income within plus or minus ten percent of the search user income). In this manner, the data stored in the marketplace databases 305a-c may be leveraged to define groups at desired levels of association relative to the search user.

According to aspects herein, after defining the first, second, and third groups, the recommendation tool 153 accesses the recommendations database 305d to obtain recommendations by users contained in the defined groups. As described herein, each recommendation may be stored with a user-ID of the user that made the recommendation, and the recommendation tool 153 may perform the search based on the user-IDs of users in the defined groups. For example, the recommendation tool 153 searches the recommendation database 305d for all stored recommendations that are associated with a user-ID of a user of the first group and that are directed to a healthcare provider that matches the selected specialty (from specialty field 412) and location (from location field 414 or default location). Similarly, the recommendation tool 153 searches the recommendation database 305d for all stored recommendations that are associated with a user-ID of a user of the second group and that are directed to a healthcare provider that matches the selected specialty (from specialty field 412) and location (from location field 414 or default location). Similarly, the recommendation tool 153 searches the recommendation database 305d for all stored recommendations that are associated with a user-ID of a user of the third group and that are directed to a healthcare provider that matches the selected specialty (from specialty field 412) and location (from location field 414 or default location). The recommendation tool 153 obtains data for all such previously provided (e.g., stored) recommendations and categorizes the recommendations according to the first, second, and third groups.

Figure 5:
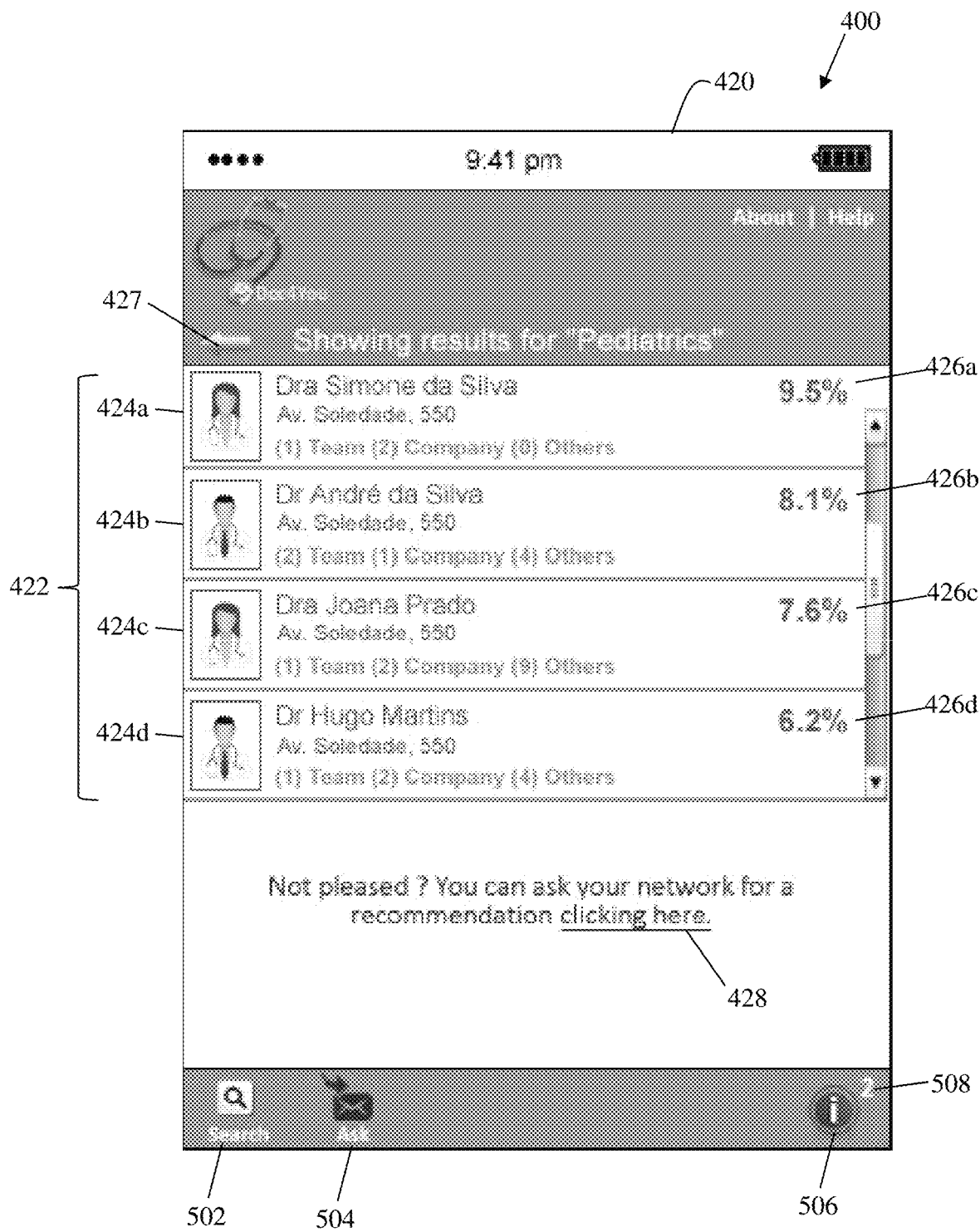

FIG. 5 shows a second screen 420 of the UI 400 in accordance with aspects of the invention. In embodiments, the second screen 420 is a results page that shows the results of the search that the search user submitted via the first screen (i.e., first screen 410 of FIG. 4). As shown in FIG. 5, the second screen 420 shows a list 422 of healthcare providers that match the selected specialty (from specialty field 412) and location (from location field 414 or default location), and that have been provided with a recommendation by at least one user in the first, second, and third groups. In embodiments, each healthcare provider is shown in a respective area 424a-d in the list 422, and each respective area 424a-d displays the number of recommendations this person has received for each of the first, second, and third groups. For example, "Dra Simone da Silva" is shown in area 424a as a healthcare provider that matches the user-selected specialty (pediatrics in this example) and location, and that has been recommended by one user in the first group (i.e., "Team") and two users in the second group (i.e., "Company"). As another example, "Dr Andre da Silva" is shown in area 424b as a healthcare provider that matches the user-selected specialty (pediatrics in this example) and location, and that has been recommended by two users in the first group (i.e., "Team"), one user in the second group (i.e., "Company"), and four users in the third group (i.e., "Others").

Still referring to FIG. 5, each area 424a-d may also display a score 426a-d for the respective healthcare provider. The scores 426a-d represent a ranking of the healthcare providers and may be determined in any desired manner. For example, the scores 426a-d may be determined using a Net Promoter Score (NPS) methodology based on input from users who provide the recommendations that are stored in recommendation database 305d. The scores 426a-d may be stored in recommendation database 305d and obtained by the recommendation tool 153 when the recommendation tool 153 searches recommendation database 305d for healthcare providers that satisfy the search query submitted via the first screen (i.e., first screen 410 of FIG. 4).

As shown in FIG. 5, the second screen 420 may include a back button 427 that the search user may select to navigate back to the first screen 410 shown in FIG. 4. The second screen 420 may also include a selectable object 428 that the user may select to navigate to a fourth screen to ask users for recommendations, as described in greater detail with respect to FIG. 7.

Figure 6:
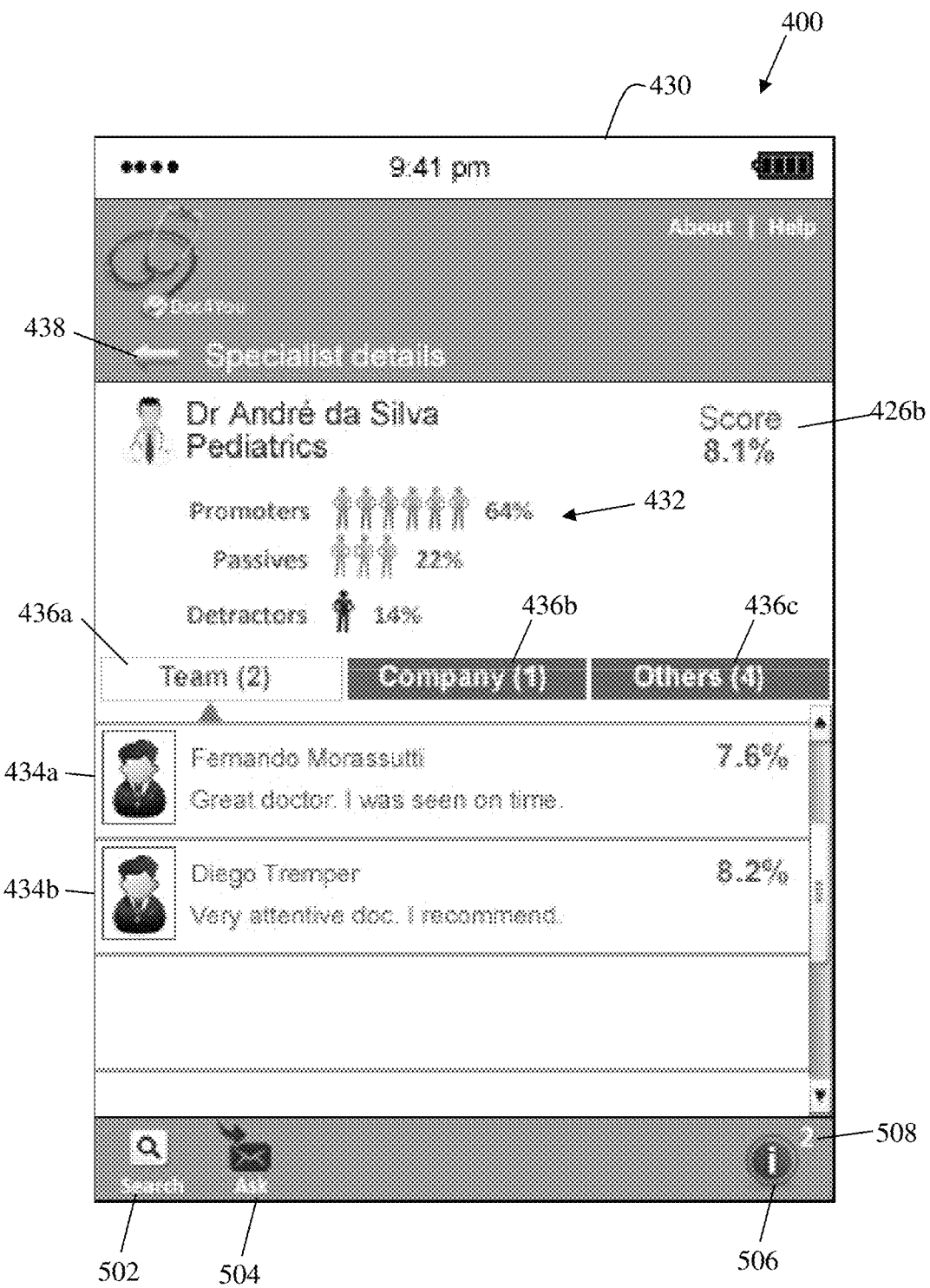

With continued reference to FIG. 5, each area 424a-d may include a selectable object (e.g., a button), or may itself be a selectable object, that the search user may select to view a details page that shows additional details about the selected healthcare provider. For example, by selecting (e.g., finger tapping) area 424b, the search user causes the UI 400 to display a third screen 430 as shown in FIG. 6. The additional details shown in the third screen 430 may include a display 432 of the number of promoters, passives, and detractors that make up the NPS score 426b. The additional details shown in the third screen 430 may include the text of each recommendation and the name of the user that provided the recommendation. For example, at area 434a the third screen 430 shows the text of a recommendation for "Dr Andre da Silva" that was previously provided by a user named "Fernando Morassutti" who is in the first group (e.g., the team group in this example). Similarly, at area 434b the third screen 430 shows the text of a recommendation for "Dr Andre da Silva" that was previously provided by a user named "Diego Tremper" who is in the first group. Each area 434a-b may also display an NPS score input provided by the user that made the recommendation (e.g., "Fernando Morassutti" ranked "Dr Andre da Silva" as a 7 out of possible 10).

Still referring to FIG. 6, the third screen 430 may also include respective tabs 436a-c associated with each of the first, second, and third groups. By selecting one of the tabs 436a-c (e.g., by finger tap), the search user may navigate to the view the recommendations of the users in the selected group. For example, FIG. 6 shows the first tab 436a as being selected and thus shows recommendations of users in the first group. In this particular example, if the search user selects tab 436b, the third screen 430 will change to replace areas 434a-b with a new area that contains a recommendations of one user in the second group. In this particular example, if the search user selects tab 436c, the third screen 430 will change to replace areas 434a-b with four new areas that contain recommendations of four users in the third group. As shown in FIG. 6, the third screen 430 may include a back button 438 that the search user may select to navigate back to the second screen 420 shown in FIG. 5.

Figure 7:
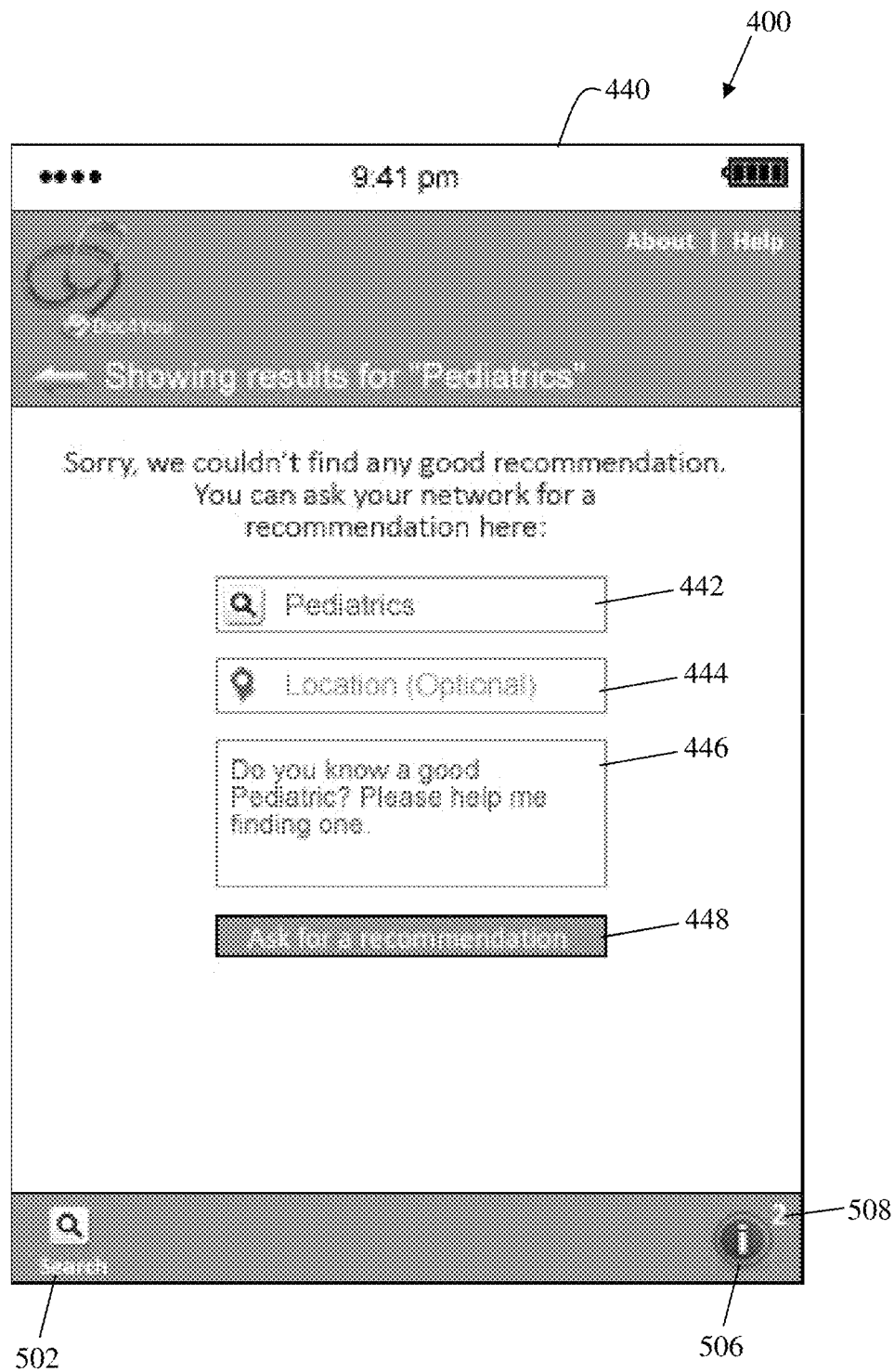

FIG. 7 shows a fourth screen 440 of the UI 400 in accordance with aspects of the invention. In embodiments, the fourth screen 440 is a request recommendations page that permits the search user to send a request message to other users. The request message prompts the other users to provide a recommendation for healthcare providers that match the selected specialty (from specialty field 412) and location (from location field 414 or default location). The system may show the fourth screen 440 when the search user's query returns no hits, i.e., when the recommendation tool 153 cannot find any results in recommendation database 305d that match the selected specialty (from specialty field 412) and location (from location field 414 or default location). The system may also show the fourth screen 440 when the user selects object 428 on the second screen 420, e.g., in the case where the search user is not satisfied with the results of the initial search query.

Figure 8:
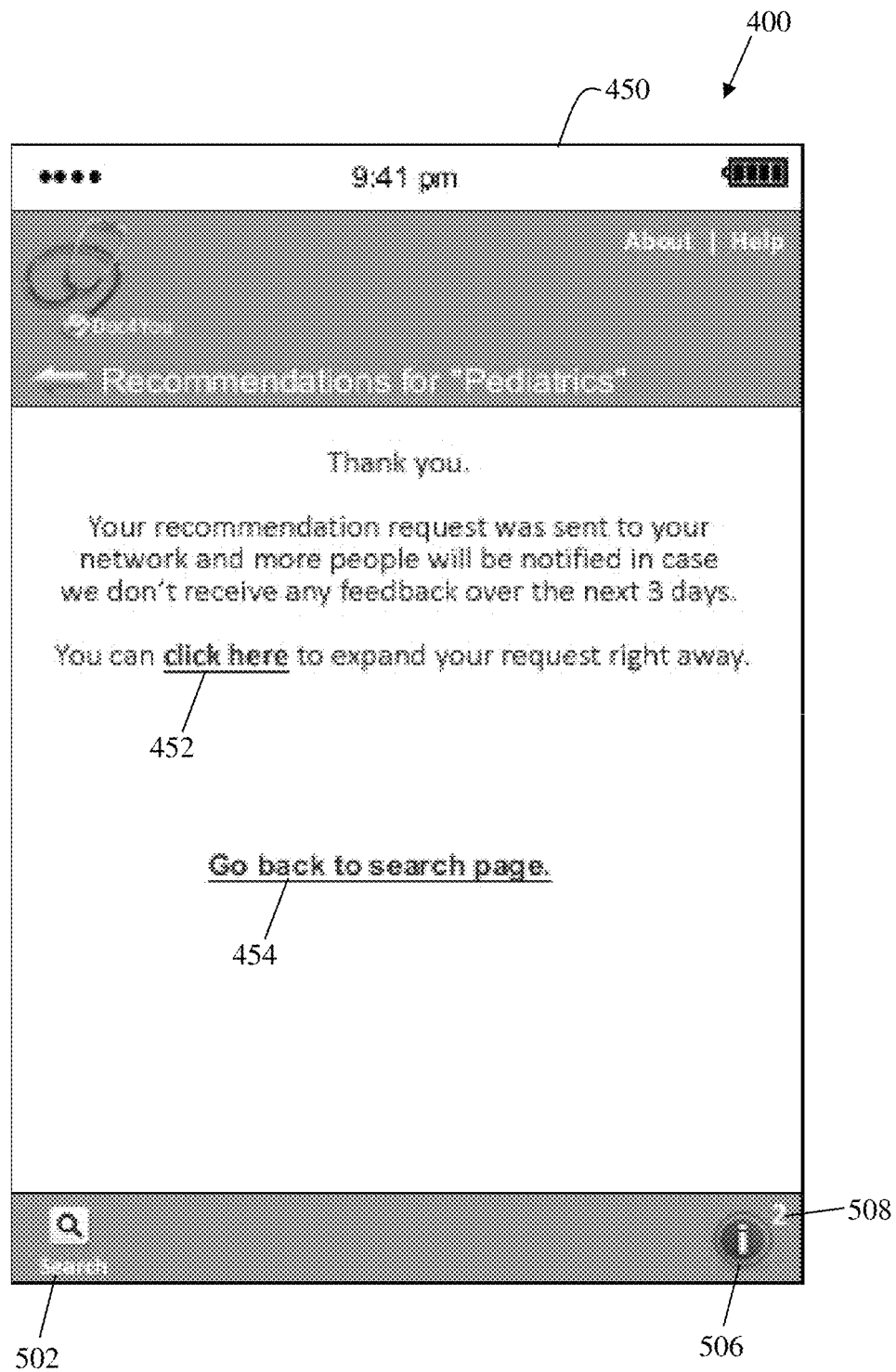

As shown in FIG. 7, the fourth screen 440 includes a specialty field 442 and a location field 444 that may function in a manner similar to specialty field 412 and location field 414 of the first screen 410. In embodiments, the fourth screen 440 also includes a text field 446 in which the search user may input text that is sent to other users to request a recommendation. The fourth screen 440 also includes a submit button 448 that the search user may select to submit the request for recommendations. Upon selection of the submit button 448, the UI 400 displays a fifth screen 450 as shown in FIG. 8. The recommendation tool 153 also sends the request for recommendations to the client computing devices of other users.

In embodiments, the request for recommendations is initially sent only to users in the first group (e.g., the team group in this example). The recommendation tool 153 waits a first predetermined amount of time for users of the first group to respond with recommendations. In the example shown in FIG. 8, the first predetermined amount of time is three days, although other time periods may be used. In the event that the other users to whom the request was sent do not provide any recommendations within the first predetermined amount of time, the recommendation tool 153 then sends the request for recommendations to the users of the second group (e.g., the employer group in this example). Alternatively, as shown in FIG. 8, the search user may select object 452 to skip the first time period and immediately send the request for recommendations to the users of the second group. The fifth screen 450 may also have a selectable object 454 that the search user may select to navigate back to the first screen 410.

Figure 9:
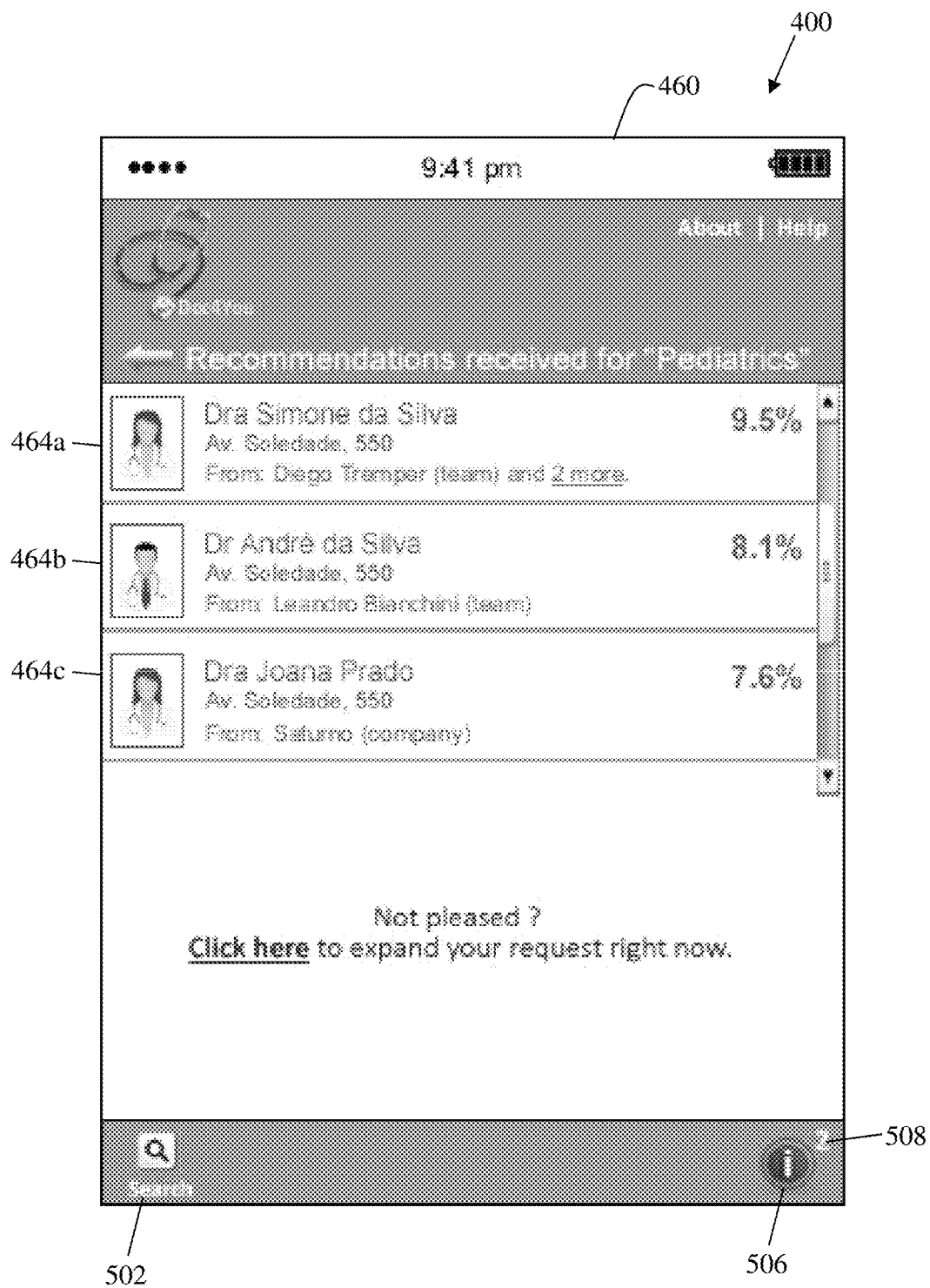

FIG. 9 shows a sixth screen 460 of the UI 400 in accordance with aspects of the invention. The sixth screen 460 is a requested recommendation result page that displays recommendations 464a-c that are received from other users in response to the request for recommendations that was sent using the fourth screen 440. In embodiments, each displayed recommendation includes a name of the recommended healthcare provider, a name of the recommending user, which group the recommending user is in (e.g., team, company, etc.), and a score assigned by the recommending user for the recommended healthcare provider.

The various screens of the UI 400 (e.g., screens 410, 420, 430, 440, 450, 460) may include additional features that provide additional functionality beyond that described herein. For example, any of the screens may include a selectable object 502 that the search user may select to navigate directly to the first screen 410. One or more of the screens may include a selectable object 504 that the search user may select to navigate to the fourth screen. One or more of the screens may include an alert 508 that indicates a number of recommendations that have been received in response to a request for recommendations. One or more of the screens may include a selectable object 506 that the search user may select to navigate to the sixth screen to view the recommendations that have been received in response to a request for recommendations.

Figure 10:
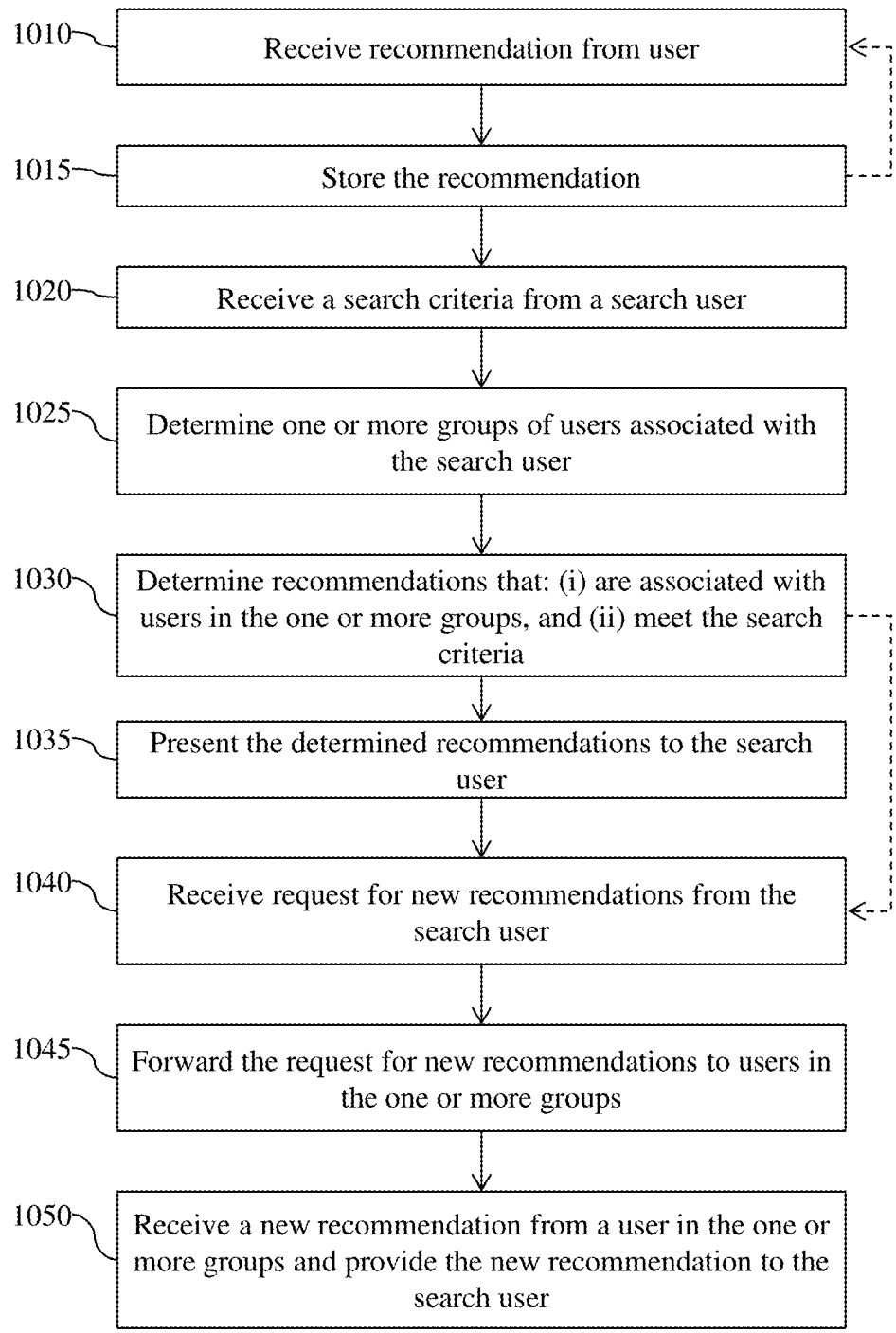
FIG. 10 shows a flow diagram of an exemplary process in accordance with aspects of the invention.

FIG. 10 depicts an exemplary flow for a process in accordance with aspects of the present invention. The exemplary flow can be illustrative of a system, a method, and/or a computer program product and related functionality implemented on the computing system of FIG. 1, in accordance with aspects of the present invention. The computer program product may include computer readable program instructions stored on computer readable storage medium (or media). The computer readable storage medium may include the one or more storage medium as described with regard to FIG. 1, e.g., non-transitory media, a tangible device, etc. The method, and/or computer program product implementing the flow of FIG. 10 can be downloaded to respective computing/processing devices, e.g., computing system of FIG. 1 as already described herein, or implemented on a cloud infrastructure as described with regard to FIG. 2. The process of FIG. 10 may be carried out in the environment of FIG. 3, for example. Accordingly, the processes associated with each flow of the present invention can be implemented by special purpose hardware-based systems that perform the specified functions or acts or carry out combinations of special purpose hardware and computer instructions.

At step 1010, a computing device (e.g., computing device 105 running recommendation tool 153) receives a recommendation of a service provider (e.g., a healthcare service provider, such as a doctor) from a user. The recommendation may be received by the computing device from a client computing device (e.g., client computing device 210n) of the user providing the recommendation. The recommendation may include a name of the service provider, text comments of the user about the service provider, and a user answer to an NPS query about the service provider.

At step 1015, the computing device running the recommendation tool stores the recommendation (e.g., in recommendation database 305d). In embodiments, the storing includes associating the recommendation with the user that provided the recommendation, e.g., by user-ID such as user name, employee identification number, etc. Steps 1010 and 1015 may be repeated any number of times for any number of users as indicated by the dashed arrow from box 1015 to box 1010. In this manner a repository of recommendations is created and stored (e.g., in the recommendation database 305d).

At step 1020, the computing device running the recommendation tool receives search criteria from a search user. Step 1020 may be performed in a manner similar to that described with respect to FIG. 4. For example, the search user may utilize a client computing device to input a specialty of a service provider and a location. The computing device running the recommendation tool may receive the search criteria from the client computing device via network communication.

At step 1025, the computing device running the recommendation tool determines one or more groups of users associated with the search user. Step 1025 may be performed in a manner similar to that described with respect to FIGS. 4 and 5. For example, the recommendation tool may access and utilize data stored at least one of an HR database, benefits database, and payroll database (e.g., databases 305a-c) to determine the one or more groups of uses associated with the search user.

At step 1030, the computing device running the recommendation tool determines recommendations that: (i) are associated with a user in the one or more groups, and (ii) meet the search criteria. Step 1030 may be performed in a manner similar to that described with respect to FIGS. 4 and 5. For example, the recommendation tool may use conventional techniques to search a database of service providers to determine service providers that meet the specialty and location criteria. The recommendation tool may then compare the determined service providers (that meet the specialty and location criteria) to the recommendations of the users in the one or more groups stored in the recommendation database 305d. Any recommendation that is both associated with a user contained in the one or more groups and that is for a determined service provider that meets the specialty and location criteria is flagged as a valid search result for the search user.

At step 1035, the computing device running the recommendation tool presents the determined recommendations to the search user. Step 1035 may be performed in a manner similar to that described with respect to FIGS. 5 and 6. For example, the recommendation tool may transmit data defining the determined recommendations to the client computing device of the search user.

In the event that there are no recommendations determined at step 1030, or in the event that the search user is not satisfied with the recommendations presented at step 1035, then at step 1040 the computing device running the recommendation tool receives a request for new recommendations from the search user. Step 1040 may be performed in a manner similar to that described with respect to FIG. 7. For example, the search user may use their client computing device to input data that defines a request for new recommendations, and the client computing device transmits the request to the computing device running the recommendation tool.

At step 1045, the computing device running the recommendation tool forwards the request for new recommendations to the users in the one or more groups. Step 1045 may be performed in a manner similar to that described with respect to FIGS. 7 and 8. For example, the recommendation tool may transmit data defining the request for new recommendations to the client computing devices of each user in the one or more groups.

At step 1050, the computing device running the recommendation tool receives a new recommendation from a user in the one or more groups and provides the new recommendation to the search user. Step 1050 may be performed in a manner similar to that described with respect to FIGS. 8 and 9. For example, the recommendation tool may wait for a predetermined amount of time after sending the request for new recommendations to the users in the one or more groups. During that waiting time, a user that has received the request for new recommendations may user their client computing device to input data that defines a new recommendation. The data of the new recommendation may be transmitted form the client computing device of the user making the new recommendation to the computing device running the recommendation tool, and from the computing device running the recommendation tool to the client computing device of the search user.

The foregoing examples have been provided merely for the purpose of explanation and are in no way to be construed as limiting of the present invention. While aspects of the present invention have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although aspects of the present invention have been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method providing recommendations for service providers, comprising:
  receiving search criteria from a search user, the search criteria comprising a healthcare provider specialty criteria of a healthcare provider and a default location criteria comprising a home address of the search user for searching for the healthcare provider from a computing device of the search user and for establishing an identifier of the search user;
  determining at least one group of users associated with the search user by obtaining organizational data of an employer of the search user and determining users which work in a particular group by reviewing the organizational data;
  determining a specific application programming interface (API) by using the identifier of the search user;
  accessing a first data source comprising a plurality of databases;
  using the specific API to access a database of the plurality of databases;
  determining recommendations that satisfy the search criteria and that are associated with at least one user in the at least one group of users;
  transmitting the determined recommendations to the computing device of the search user; and
  displaying on an interface of the computing device of the search user the determined recommendations comprising healthcare providers which satisfy the search criteria together with the at least one group of users,
  wherein the determining the at least one group of users and the determining the recommendations are performed by a recommendation tool running on a computing device.

2. The method of claim 1, wherein the determining the recommendations comprises accessing a second data source that is different than the first data source.

3. The method of claim 2, wherein:
  the databases of the first data source comprise a human resources database; a benefits database; and a payroll database; and the second data source comprises a recommendations database.

4. The method of claim 2, wherein:
the computing device running the recommendation tool has read only access to the first data source; and
the computing device running the recommendation tool has read access and write access to the second data source.

5. The method of claim 2, wherein the accessing the second data source comprises using a second API specific to the second data source determined by using the identifier of the search user to obtain information from the second data source.

6. The method of claim 1, wherein:
the at least one group of users comprises a first group, a second group, and a third group; and
the determining the recommendations comprises:
determining a first set of recommendations that satisfy the search criteria and that are associated with at least one user in the first group;
determining a second set of recommendations that satisfy the search criteria and that are associated with at least one user in the second group; and
determining a third set of recommendations that satisfy the search criteria and that are associated with at least one user in the third group.

7. The method of claim 1, wherein the healthcare provider specialty criteria comprises predefined specialties including a pediatrician, a cardiologist and an optometrist.

8. The method of claim 7, wherein the healthcare provider specialty criteria is selected by the search user from a drop down menu.

9. The method of claim 8, wherein the default location criteria is used when the search user does not enter a location.

10. The method of claim 8, wherein the default location criteria is automatically determined without input from the search user.

11. The method of claim 1, further comprising:
receiving, from the computing device of the search user, a request for recommendations; and
transmitting the request for recommendations to client computing devices of the at least one group of users.

12. The method of claim 11, further comprising:
receiving a new recommendation in response to the request for recommendations;
transmitting the new recommendation to the computing device of the search user; and
storing the new recommendation in a recommendations database.

13. The method of claim 11, wherein:
the at least one group of users comprises a first group of users and a second group of users; and
the transmitting the request for recommendations comprises:
transmitting the request for recommendations to client computing devices of the first group of users;
waiting a predetermined amount of time; and
after the waiting, transmitting the request for recommendations to client computing devices of the second group of users.

14. The method of claim 1, wherein the recommendations are associated with the healthcare service providers satisfying the healthcare provider specialty and the location.

15. The method of claim 14, further comprising determining a ranked score for each of the healthcare service providers based on the recommendations.

16. A computer system for providing recommendations of healthcare service providers, comprising:
a hardware memory device that stores program instructions of a recommendation tool; and
a hardware processor that executes the program instructions and causes the computer system to:
receive recommendations of healthcare service providers from at least one recommending user contained in a plurality of users;
store the recommendations in a recommendations database;
receive search criteria from a search user comprising specialties of the healthcare service providers and a default location comprising a work address of the search user for identifier information of the search user as part of the search query;
determine a group of users associated with the search user by obtaining an organizational chart of an employer of the search user and determining users belonging to a same team as the search user determined from the organizational chart;
determine a specific application programming interface (API) by using the identifier information of the search user;
access a first data source comprising a plurality of databases;
use the specific API to access a database of the plurality of databases;
determine matching recommendations from the recommendations stored in the recommendations database, wherein each of the matching recommendations satisfies the search criteria and is associated with one of the users in the group of users;
transmit the matching recommendations to the search user; and
display to the search user through an interface the matching recommendations which comprise the healthcare service providers that satisfy the search criteria and the group of users to view recommendations from the group of users.

17. The computer system of claim 16, wherein the plurality of databases include a human resources database, a benefits database, and a payroll database that store information about the plurality of users and that are separate from the recommendations database.

18. The computer system of claim 16, wherein the computer system is configured to:
receive, from the search user, a request for recommendations;
transmit the request for recommendations to the group of users;
receive a new recommendation in response to the request for recommendations;
transmit the new recommendation to the search user; and
store the new recommendation in the recommendations database.

19. A computer program product for providing recommendations of healthcare service providers, the computer program product comprising computer readable program instructions stored on a non-transitory computer readable storage medium, the computer readable program instructions being executable on a computing device to cause the computing device to:
receive recommendations of healthcare service providers from at least one recommending user contained in a plurality of users;

store the recommendations in a recommendations database;

receive search criteria for a search query comprising a healthcare provider specialty of a healthcare provider and a default location comprising a home address of a search user from the search user for identifier information of the search user as part of the search query;

determine automatically a first group of users associated with the search user and a second group of users associated with the search user based on employment data stored in a database by obtaining an organizational chart of an employer of the search user and determining the first group according to which of the plurality of users belongs to a same work team as the search user and the second group according to which of the plurality of users are not employed by the employer of the search user by reviewing the organizational chart;

determine a specific application programming interface (API) by using the identifier information of the search user;

accessing a first data source comprising a plurality of databases;

using the specific API to access a database of the plurality of databases;

determine automatically a first matching recommendation from the recommendations stored in the recommendations database, wherein the first matching recommendation satisfies the search criteria and is associated with a first user in the first group of users;

determine automatically a second matching recommendation from the recommendations stored in the recommendations database, wherein the second matching recommendation satisfies the search criteria and is associated with a second user in the second group of users;

transmit automatically the first matching recommendation and an identity of the first user to the search user;

transmit automatically the second matching recommendation and an identity of the second user to the search user;

display to the search user on an interface the second matching recommendation which comprises the healthcare service providers within the second matching recommendation that satisfy the search criteria together with the second group of users; and display to the search user on the interface a plurality of new recommendations from a third group of users by replacing the displayed second matching recommendation with new areas containing the new recommendations from the third group of users in response to the search user interacting with the interface.

20. The computer program product of claim 19, wherein the computer readable program instructions being executable on the computing device cause the computing device to:

receive, from the search user, a request for recommendations;

transmit the request for recommendations to at least one of the first group of users and the second group of users;

receive a new recommendation in response to the request for recommendations;

transmit the new recommendation to the search user; and store the new recommendation in the recommendations database.

* * * * *